United States Patent
Brothers et al.

(10) Patent No.: US 10,497,164 B2
(45) Date of Patent: Dec. 3, 2019

(54) ANIMATION FOR REPRESENTING ELEVATOR CAR MOVEMENT

(71) Applicant: OTIS ELEVATOR COMPANY, Farmington, CT (US)

(72) Inventors: Sheryl Brothers, Wethersfield, CT (US); Emily Baldi, East Hartford, CT (US); Paul A. Simcik, Southington, CT (US); Kelly Martin Dubois, Unionville, CT (US)

(73) Assignee: OTIS ELEVATOR COMPANY, Farmington, CT (US)

( * ) Notice: Subject to any disclaimer, the term of this patent is extended or adjusted under 35 U.S.C. 154(b) by 10 days.

(21) Appl. No.: 15/476,750

(22) Filed: Mar. 31, 2017

(65) Prior Publication Data

US 2018/0286100 A1    Oct. 4, 2018

(51) Int. Cl.
  *B66B 1/16*   (2006.01)
  *G06T 13/80*  (2011.01)
  (Continued)

(52) U.S. Cl.
  CPC .............. *G06T 13/80* (2013.01); *A63F 13/65* (2014.09); *A63F 13/822* (2014.09); *A63F 13/85* (2014.09);
  (Continued)

(58) Field of Classification Search
  CPC ................ G06T 13/80; G06T 2200/24; G09G 2340/0464; G09G 2201/4653; G09G 5/34; G09G 5/37; A63F 13/92; A63F 13/85; A63F 13/65; A63F 13/822; B66B 2201/4623; B66B 2201/4653; B66B 3/00; B66B 1/468
  (Continued)

(56) References Cited

U.S. PATENT DOCUMENTS 4,852,696 A * 8/1989 Fukuda .................... B66B 3/00
                                                      187/392
5,042,620 A    8/1991 Yoneda et al.
(Continued)

FOREIGN PATENT DOCUMENTS

CN    104229577 A    12/2014
CN    10492599 A      9/2015
(Continued)

OTHER PUBLICATIONS

OffTopic2012 (username), "KONE RemoteCall Demo App in Action", YouTube video, available at: https://www.youtube.com/watch?v=bfdp3b_IV98, accessed Mar. 31, 2017, _pgs.
(Continued)

*Primary Examiner* — Jeffrey Donels
(74) *Attorney, Agent, or Firm* — Cantor Colburn LLP

(57) ABSTRACT

A method for presenting an estimated elevator car arrival time, the method comprising: receiving an elevator call at a mobile device; obtaining the estimated elevator car arrival time in response to the elevator call; and generating a user interface depicting the estimated elevator car arrival time, the user interface depicting the estimated elevator car arrival time including a stylistic animation that changes appearance in response to the estimated elevator car arrival time.

19 Claims, 14 Drawing Sheets

(51) Int. Cl.
*B66B 1/46* (2006.01)
*B66B 3/00* (2006.01)
*A63F 13/65* (2014.01)
*A63F 13/822* (2014.01)
*A63F 13/85* (2014.01)
*A63F 13/92* (2014.01)
*G09G 5/34* (2006.01)
*G09G 5/37* (2006.01)
*H04B 1/3827* (2015.01)

(52) U.S. Cl.
CPC .............. *A63F 13/92* (2014.09); *B66B 1/468* (2013.01); *B66B 3/00* (2013.01); *G09G 5/34* (2013.01); *G09G 5/37* (2013.01); *H04B 1/3833* (2013.01); *A63F 2300/8064* (2013.01); *A63F 2300/8094* (2013.01); *B66B 2201/4615* (2013.01); *B66B 2201/4623* (2013.01); *B66B 2201/4653* (2013.01); *G06T 2200/24* (2013.01); *G09G 2320/08* (2013.01); *G09G 2320/10* (2013.01); *G09G 2340/0464* (2013.01); *G09G 2354/00* (2013.01)

(58) Field of Classification Search
USPC ........................................................ 187/388
See application file for complete search history.

(56) References Cited

U.S. PATENT DOCUMENTS

| | | | |
|---|---|---|---|
| 5,194,702 A * | 3/1993 | Swonger, Jr. ............. | B66B 3/02 187/395 |
| 5,886,696 A * | 3/1999 | Kakko ...................... | B66B 3/02 187/397 |
| 6,550,587 B1 | 4/2003 | Yuasa et al. | |
| 6,570,557 B1 | 5/2003 | Westerman et al. | |
| 7,040,459 B2 * | 5/2006 | Matsuda ................. | B66B 3/023 187/394 |
| 7,098,896 B2 | 8/2006 | Kushler et al. | |
| 7,250,938 B2 | 7/2007 | Kirkland et al. | |
| 7,377,364 B2 | 5/2008 | Tyni et al. | |
| 7,445,090 B2 | 11/2008 | Bodmer et al. | |
| 7,610,995 B2 * | 11/2009 | Ylinen ...................... | B66B 1/34 187/381 |
| 7,711,565 B1 * | 5/2010 | Gazdzinski ............... | B66B 3/00 187/396 |
| 7,766,129 B2 | 8/2010 | Makela et al. | |
| 8,059,101 B2 | 11/2011 | Westerman et al. | |
| 8,136,636 B2 | 3/2012 | Bahjat et al. | |
| 94,156,654 | 10/2015 | Katsura | |
| 9,377,319 B2 | 6/2016 | San Filippo et al. | |
| 9,469,502 B2 | 10/2016 | Parkkinen et al. | |
| 2006/0225964 A1 | 10/2006 | Takeuchi | |
| 2008/0067013 A1 * | 3/2008 | Ylinen ...................... | B66B 1/34 187/382 |
| 2009/0022131 A1 * | 1/2009 | Rusanen ................. | B66B 1/468 370/338 |
| 2009/0294221 A1 | 12/2009 | Bahjat et al. | |
| 2011/0238755 A1 | 9/2011 | Khan et al. | |
| 2014/0014444 A1 | 1/2014 | Kauppinen et al. | |
| 2014/0015753 A1 | 1/2014 | Pai | |
| 2014/0131142 A1 | 5/2014 | Parkkinen et al. | |
| 2014/0146007 A1 | 5/2014 | Lee et al. | |
| 2015/0246790 A1 | 9/2015 | Hiltunen et al. | |
| 2015/0314986 A1 | 11/2015 | Schwarzentruber | |
| 2015/0350414 A1 | 12/2015 | Park et al. | |
| 2016/0096706 A1 | 4/2016 | Tang | |
| 2016/0347578 A1 | 12/2016 | Simcik et al. | |
| 2016/0355375 A1 | 12/2016 | Simcik et al. | |
| 2018/0086596 A1 * | 3/2018 | Collins ..................... | B66B 1/28 |
| 2018/0118510 A1 * | 5/2018 | Simcik ..................... | B66B 1/468 |
| 2018/0126271 A1 * | 5/2018 | Katzir ...................... | A63F 13/52 |
| 2018/0162690 A1 * | 6/2018 | Hsu ........................ | B66B 5/0006 |
| 2018/0282113 A1 | 10/2018 | Simcik | |
| 2018/0282115 A1 | 10/2018 | Baldi et al. | |

FOREIGN PATENT DOCUMENTS

| | | |
|---|---|---|
| DE | 202016003883 U1 | 7/2016 |
| EP | 0403232 A2 | 12/1990 |
| EP | 2349901 A1 | 8/2011 |
| EP | 2392534 A1 | 12/2011 |
| EP | 2730530 A1 | 5/2014 |
| EP | 2953879 A1 | 12/2015 |
| EP | 3210921 A1 | 8/2017 |
| EP | 3326950 A1 | 5/2018 |
| KR | 20120101744 A | 9/2012 |
| WO | 2006000618 A2 | 1/2006 |
| WO | 2006101316 A1 | 9/2006 |
| WO | 2009127611 A1 | 10/2009 |
| WO | 2010061036 A1 | 6/2010 |
| WO | 2014121437 A1 | 8/2014 |
| WO | 2016044061 A1 | 3/2016 |
| WO | 2016073061 A1 | 5/2016 |
| WO | 2016135371 A1 | 9/2016 |
| WO | 2016198548 A1 | 12/2016 |

OTHER PUBLICATIONS

English Abstact for CN104925599A—Sep. 23, 2015; 1 pg.
English Abstact for DE202016003883U1—Jul. 15, 2016; 1 pg.
English Abstract for CN104229577A—Dec. 24, 2014; 1 pg.
English Abstract for KR20120101744A—Sep. 17, 2012; 1 pg.
English Abstract for WO2009127611A1—Oct. 22, 2009; 2 pgs.
English Abstract for WO2016198548A1—Dec. 15, 2016; 1 pg.
KONE RemoteCall—TM; Smartphone Application for Kone Polaris—TM 900 Destination Control Sytem; 2013; 2 pgs.
Title: "Otis eCall Portray"; Otis Elevator Company; Windows Apps on Microsoft Store; https://www.microsoft.com/en-us/store/p/otis-ecall-portray/9nblggh401zs; 3 pgs.
European Search Report for Application No. 18165212.4-1017/3381852; dated Nov. 12, 2018, 2018; 8 pgs.
Non-Final Office Action for U.S. Appl. No. 15/476,727, filed Mar. 31, 2017, dated Jan. 22, 2019; 43 pgs.
"Kone RemoteCall"; Yingling Fan; Andrew Guthrie; David Levinson; www.kone.com; Jun. 1, 2016, XP055466127; DOI: 10.1016/j. tra. 2016.04.012; Retrieved from the Internet: URL: https://www.kone.com.tr/Images/factsheet-kone-remotecall_tcm115-18641.pdf [retrieved on Apr. 11, 2018]; 2 pgs.
European Search Report for Application No. 18164233.1-1017; dated: Aug. 8, 2018; 13 pgs.
Non-Final Office Action for U.S. Appl. No. 15/476,475 dated Jan. 2, 2019; filed Mar. 31, 2017; Confirmation No. 6844; Art Unit 2143; 20 pgs.
European Search Report for Application No. 18164659.7-1017/3381851 dated Oct. 24, 2018; 11 pgs.

* cited by examiner

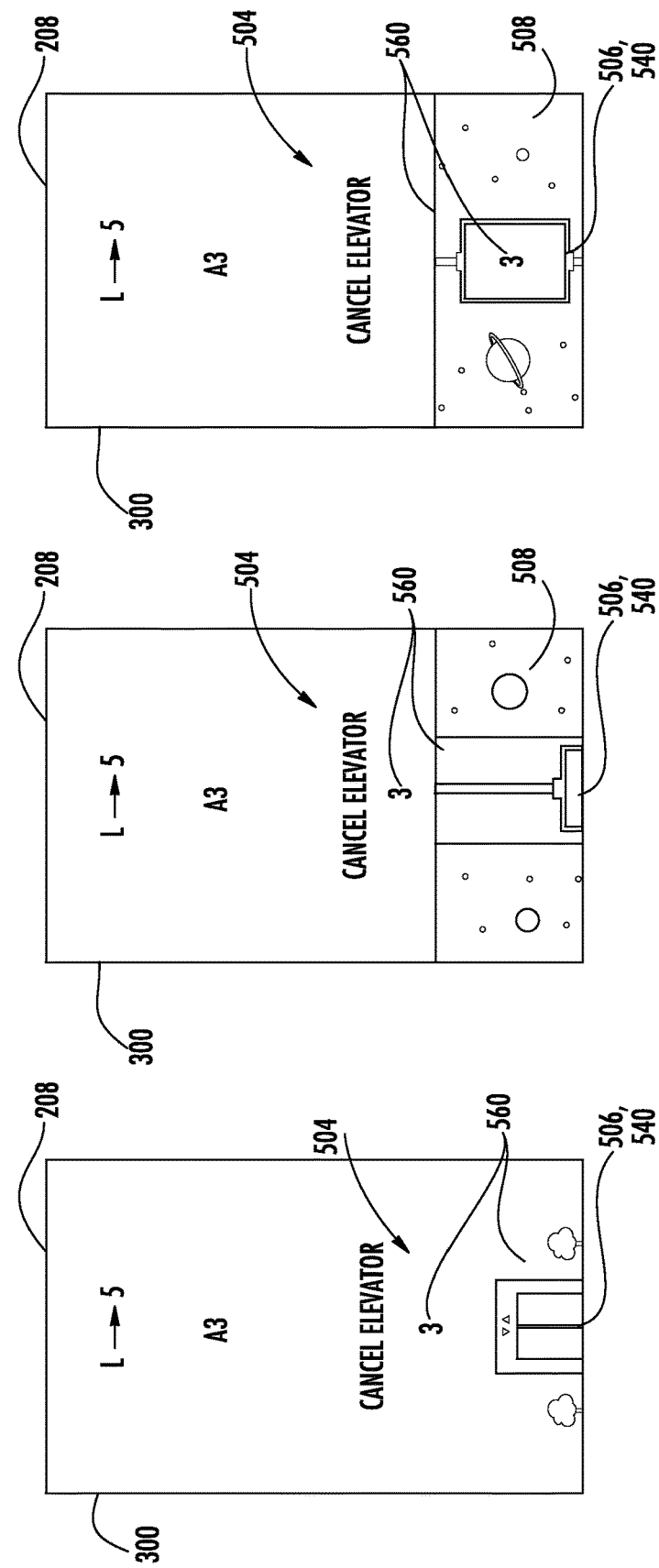

ANIMATION FOR REPRESENTING ELEVATOR CAR MOVEMENT

BACKGROUND

Existing elevator systems allow a user to submit an elevator call (e.g., a hall call or a destination call) using their own mobile device (e.g., a smartphone). Users of elevator systems often desire to know the arrival time of their assigned elevator car. It can be difficult to precisely indicate an elevator car arrival time. As more elevator demands are entered, elevator assignments change, which can further affect the elevator car arrival time. This makes displaying an accurate elevator car arrival time difficult.

In some mobile device applications designed for calling an elevator remotely, the application may depict cycling floor numbers or other representations of a position indicator to provide feedback to the user regarding the status of the elevator car. However, the data to display this information may not be accurate due to time delays in cellular or other signal delivery to the user's mobile device.

BRIEF SUMMARY

According to one embodiment described herein is a method for presenting an estimated elevator car arrival time, the method comprising: receiving an elevator call at a mobile device; obtaining the estimated elevator car arrival time in response to the elevator call; and generating a user interface depicting the estimated elevator car arrival time, the user interface depicting the estimated elevator car arrival time including a stylistic animation that changes appearance in response to the estimated elevator car arrival time.

In addition to one or more of the features described above, or as an alternative, further embodiments may include wherein the elevator call comprises a hall call or a destination call.

In addition to one or more of the features described above, or as an alternative, further embodiments may include generating on the user interface an elevator car arrival indicator upon determining the elevator car has arrived at a starting floor.

In addition to one or more of the features described above, or as an alternative, further embodiments may include determining an elevator car assignment in response to the elevator call.

In addition to one or more of the features described above, or as an alternative, further embodiments may include wherein determining the elevator car has arrived at the starting floor comprises receiving a message that the elevator car has arrived at the starting floor.

In addition to one or more of the features described above, or as an alternative, further embodiments may include wherein determining the elevator car has arrived at the starting floor comprises determining that a timeout period has expired since receiving the elevator call.

In addition to one or more of the features described above, or as an alternative, further embodiments may include wherein the elevator car arrival indicator includes the elevator car assignment.

In addition to one or more of the features described above, or as an alternative, further embodiments may include wherein the dynamic component changes size in response to the estimated elevator car arrival time.

In addition to one or more of the features described above, or as an alternative, further embodiments may include wherein the dynamic component changes color in response to the estimated elevator car arrival time.

In addition to one or more of the features described above, or as an alternative, further embodiments may include wherein the dynamic component changes position in response to the estimated elevator car arrival time.

In addition to one or more of the features described above, or as an alternative, further embodiments may include wherein the dynamic component comprises an alphanumeric dynamic component.

In addition to one or more of the features described above, or as an alternative, further embodiments may include wherein the dynamic component comprises a graphical dynamic component.

In addition to one or more of the features described above, or as an alternative, further embodiments may include wherein the dynamic component changes appearance at a rate dependent on the estimated elevator car arrival time.

In addition to one or more of the features described above, or as an alternative, further embodiments may include wherein the rate decreases in response to an increase in the estimated elevator car arrival time.

In addition to one or more of the features described above, or as an alternative, further embodiments may include wherein the dynamic component comprises a graphical representation of an elevator car, wherein movement of the graphical representation of an elevator car corresponds to physical motion of an elevator car.

In addition to one or more of the features described above, or as an alternative, further embodiments may include wherein the position of the graphical representation of the elevator car is proportional to the current floor of the elevator car in a building.

In addition to one or more of the features described above, or as an alternative, further embodiments may include wherein the graphical representation of the elevator car includes a status of the elevator car doors.

In addition to one or more of the features described above, or as an alternative, further embodiments may include that the elevator car arrival indicator includes the elevator car assignment.

In addition to one or more of the features described above, or as an alternative, further embodiments may include that the stylistic animation changes in response to the estimated elevator car arrival time at least one of size, color, and position.

In addition to one or more of the features described above, or as an alternative, further embodiments may include the stylistic animation comprises a dynamic component wherein the dynamic component comprises at least one of an alphanumeric dynamic component and a graphical dynamic component.

In addition to one or more of the features described above, or as an alternative, further embodiments may include that the stylistic animation comprises at least one of a dynamic component, a graphical depiction of an elevator car, and a graphical depiction of floor images.

In addition to one or more of the features described above, or as an alternative, further embodiments may include that the stylistic animation includes a graphical animation responsive to the motion of the elevator car.

In addition to one or more of the features described above, or as an alternative, further embodiments may include that the graphical animation includes a set of scrolling images including a depiction of the elevator car, where the scrolling images move past the depiction of the elevator car to provide a visual appearance of motion.

In addition to one or more of the features described above, or as an alternative, further embodiments may include that the scrolling images change based on the motion of the elevator car.

In addition to one or more of the features described above, or as an alternative, further embodiments may include that the graphical animation changes speed in response to at least one of the speed of the elevator car and an estimated arrival time of the elevator car.

In addition to one or more of the features described above, or as an alternative, further embodiments may include that the graphical animation is interactive with the user.

In addition to one or more of the features described above, or as an alternative, further embodiments may include that the graphical animation changes for a selected user and provides the user with information targeted the user and wherein the user specific information includes at least one of elevator status, elevator door status, news, and a reward.

In addition to one or more of the features described above, or as an alternative, further embodiments may include that the graphical animation is at least one of a game, puzzle, and brain teaser.

In addition to one or more of the features described above, or as an alternative, further embodiments may include that success at the least one of a game, puzzle, and brain teaser at least one of provides a slogan or reward to the user, changes the elevator operation with respect to the user, and provides additional benefits to the user.

In addition to one or more of the features described above, or as an alternative, further embodiments may include tracking a location of the mobile device.

In addition to one or more of the features described above, or as an alternative, further embodiments may include that the stylistic animation is customized to at least one of the user and is responsive to the location of the user.

Also described herein in an embodiment is a mobile device including a processor, a memory comprising computer-executable instructions that, when executed by the processor, cause the processor to perform operations. The operations including generating an elevator call at a mobile device, obtaining information regarding the status of the elevator car indicative of the motion of the elevator car in response to the elevator call, and generating a user interface depicting a stylistic animation, that changes appearance in response to the motion of the elevator car.

Technical effects of embodiments include the ability to provide a user interface with an indication of an estimated elevator car arrival time. The user interface includes a dynamic component that changes appearance in response to the estimated elevator car arrival time.

BRIEF DESCRIPTION OF THE DRAWINGS

The present disclosure is illustrated by way of example and not limited in the accompanying figures in which like reference numerals indicate similar elements.

FIG. 14A depicts a user interface on a mobile device in example embodiments;

FIG. 14B depicts a user interface on a mobile device in example embodiments; and FIG. 14C depicts a user interface on a mobile device in example embodiments.

DETAILED DESCRIPTION

Figure 1:
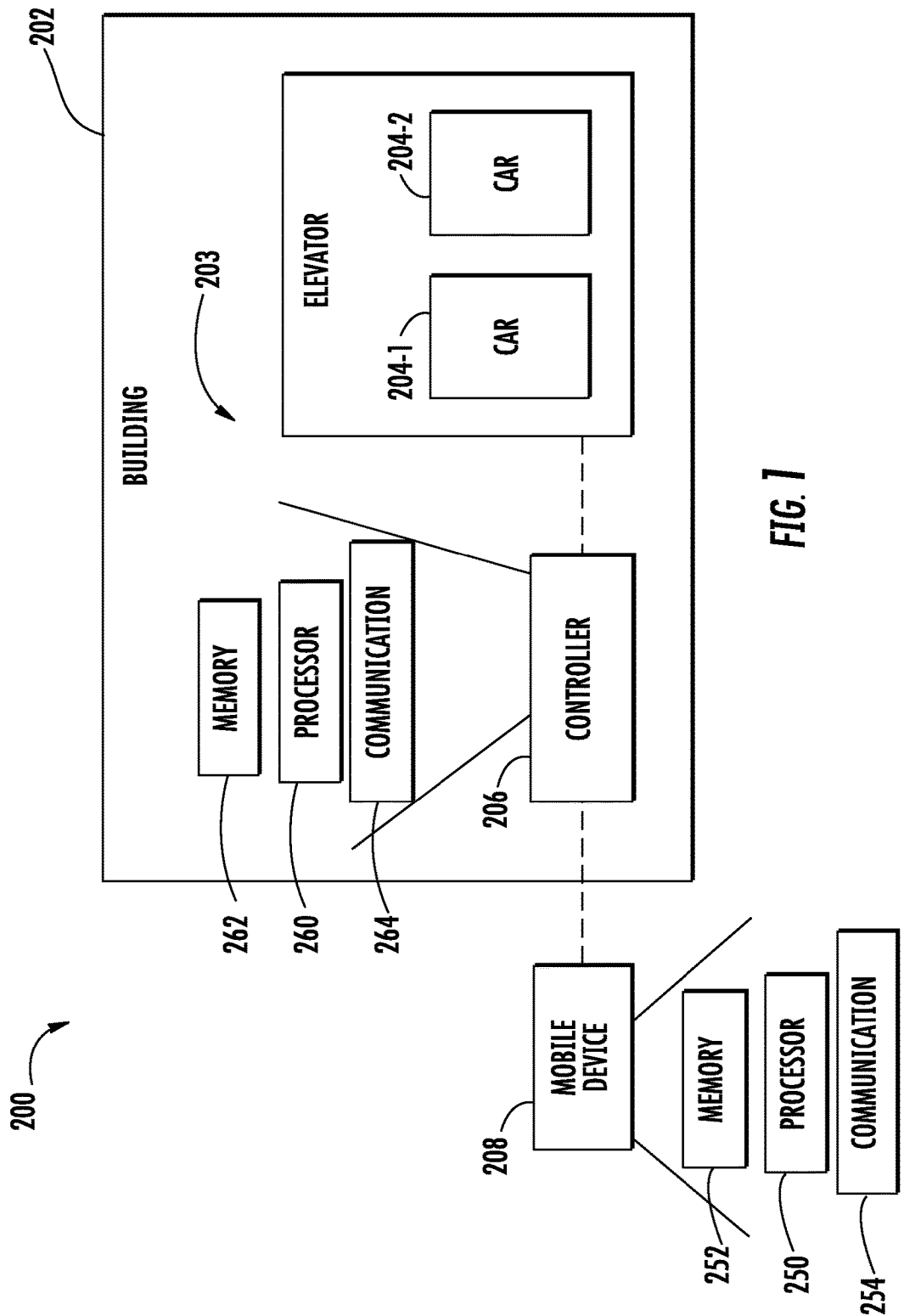
FIG. 1 depicts a system in an example embodiment.

FIG. 1 depicts a system 200 in an example embodiment. The system 200 includes an elevator system 203 installed at a building 202. In some embodiments, the building 202 may be an office building or a collection of office buildings that may or may not be physically located near each other. The building 202 may include any number of floors. Persons entering the building 202 may enter at a lobby floor, and may go to a destination floor via one or more conveyance devices, such as an elevator system 203.

The elevator system 203 may include one or more computing devices, such as a controller 206. The controller 206 may be configured to control dispatching operations for one or more elevator cars (e.g., elevator cars 204-1, 204-2) associated with the elevator system 203. It is understood that the elevator system 203 may utilize more than one controller 206, and that each controller 206 may control a group of elevators cars 204-1 and 204-2. Although two elevator cars 204-1 and 204-2 are shown in FIG. 1, it is understood that any number of elevators cars may be used in the elevator system 203. The elevator cars 204-1 and 204-2 may be located in the same hoistway or in different hoistways so as to allow coordination amongst elevator cars 204-1 and 204-2 in different elevator banks serving different floors. It is understood that other components of the elevator system 203 (e.g., drive, counterweight, safeties, etc.) are not depicted for ease of illustration.

Also shown in FIG. 1 is a mobile device 208. The mobile device 208 may include a device that is carried by a person, such as a smart phone, PDA, tablet, etc. The mobile device 208 may include wearable items, such as a smart watch, eyewear, etc. The mobile device 208 may include a processor 250, memory 252 and communication module 254 as shown in FIG. 1. The processor 250 can be any type or combination of computer processors, such as a microprocessor, microcontroller, digital signal processor, application specific integrated circuit, programmable logic device, and/or field programmable gate array. The memory 252 is an example of a non-transitory computer readable storage medium tangibly embodied in the mobile device 208 including executable instructions stored therein, for instance, as firmware. The communication module 254 may implement one or more communication protocols as described in further detail herein.

The controller 206 may include a processor 260, memory 262 and communication module 264 as shown in FIG. 1. The processor 260 can be any type or combination of computer processors, such as a microprocessor, microcontroller, digital signal processor, application specific integrated circuit, programmable logic device, and/or field programmable gate array. The memory 262 is an example of a non-transitory computer readable storage medium tangibly embodied in the controller 206 including executable instructions stored therein, for instance, as firmware. The communication module 264 may implement one or more communication protocols as described in further detail herein.

The mobile device 208 and the controller 206 communicate with one another. For example, the mobile device 208 and the controller 206 may communicate with one another when proximate to one another (e.g., within a threshold distance). The mobile device 208 and the controller 206 may communicate over a wireless network, such as 802.11x (WiFi), short-range radio (Bluetooth), etc. In some embodiments, the controller 206 may include, or be associated with (e.g., communicatively coupled to) a networked element, such as kiosk, beacon, hall call fixture, lantern, bridge, router, network node, etc. The networked element may communicate with the mobile device 208 using one or more communication protocols or standards. For example, the networked element may communicate with the mobile device 208 using near field communications (NFC). In other embodiments, the controller 206 may establish communication with a mobile device 208 that is outside of the building 202. This connection may be established with various technologies including GPS, triangulation, or signal strength detection, by way of non-limiting example. Such technologies that allow early communication will provide users and the systems more time to establish the most efficient passenger flow, and may eliminate the need for a user to stop moving to interact with the system 200. In example embodiments, the mobile device 208 communicates with the controller 206 over multiple independent wired and/or wireless networks. Embodiments are intended to cover a wide variety of types of communication between the mobile device 208 and controller 206, and embodiments are not limited to the examples provided in this disclosure.

Figure 2:
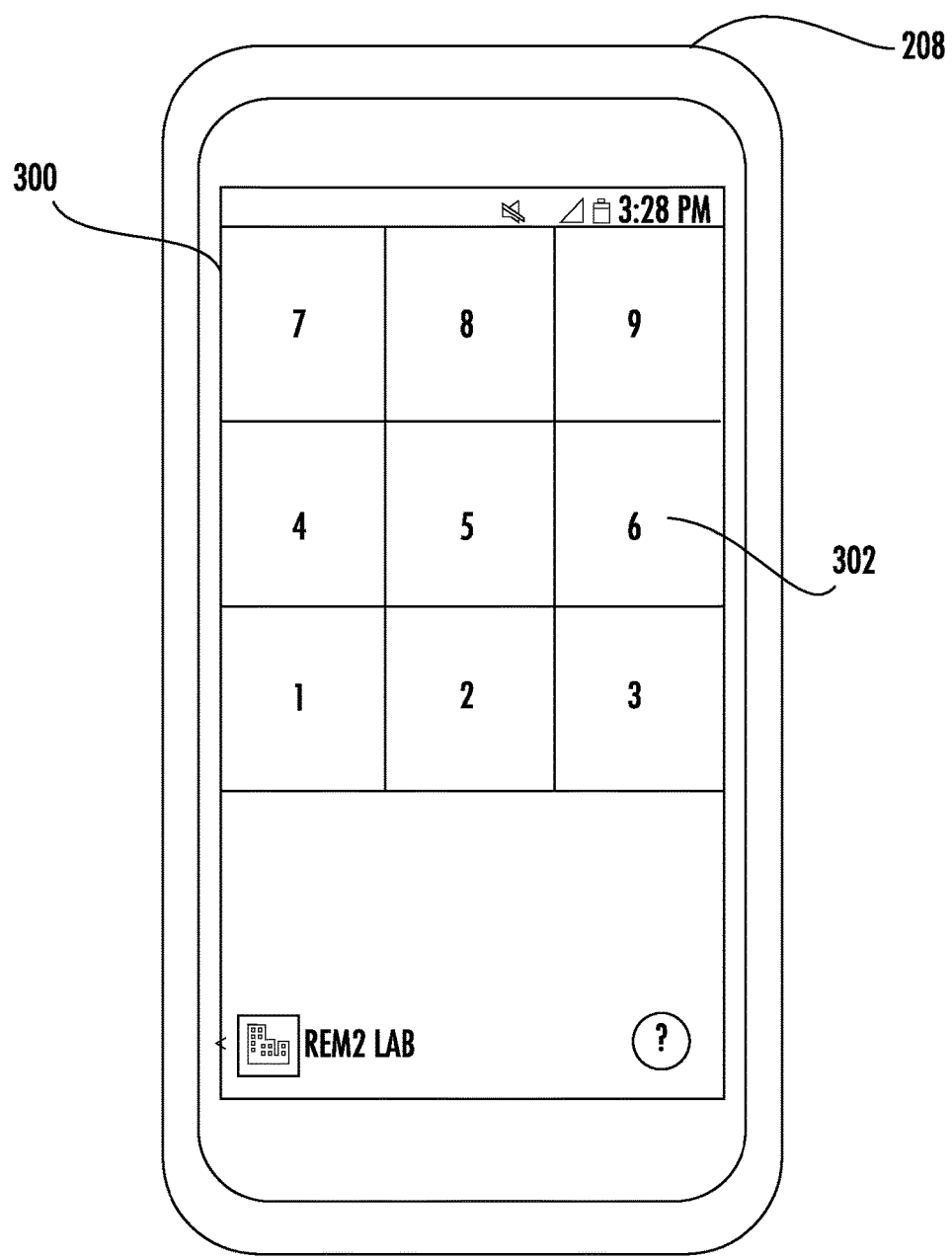
FIG. 2 depicts a user interface on a mobile device in an example embodiment.
Figure 3:
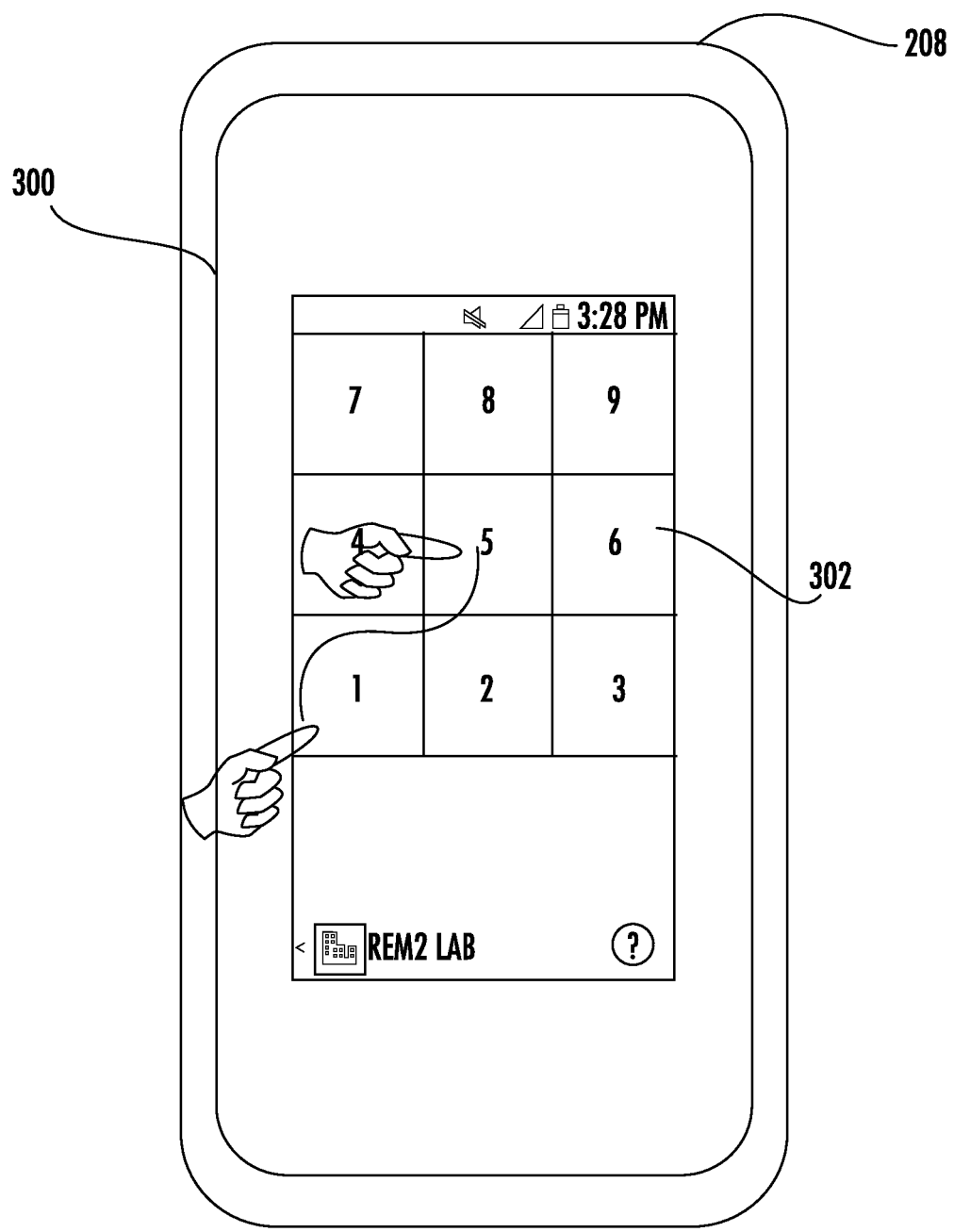
FIG. 3 depicts a user interface on a mobile device in an example embodiment.

Embodiments generate a user interface on the mobile device 208 depicting an elevator car motion and arrival time. The user interface can adjust in response to stopping and delays in the elevator car arrival time. FIGS. 2-7 depict an example user interface 300 on mobile device 208. Referring to FIG. 2, when the mobile device 208 launches an elevator interface application, an elevator call entry screen may be presented as shown in FIG. 2. The elevator call entry screen allows a user to enter an elevator call, such as a hall call or a destination call. A user interface 300 includes a plurality of floor icons 302, each floor icon 302 corresponding to a single floor of the building 202. The user can enter a destination call by selecting a starting floor and ending floor, as shown in FIG. 3. As shown in FIG. 3, the user has selected floor 1 as a starting floor and floor 5 as a destination floor. The particular user interface depicted in FIGS. 2 and 3 is exemplary. Any other desired user interface enabling a user to select a start and destination floor pairing, destination floor, preset elevator call, or any other manner of indicating the desired travel path may be used.

The elevator call is communicated from the mobile device 208 to the controller 206. The controller 206 then determines an estimated elevator car arrival time and an optional elevator car assignment. The controller 206 may use existing elevator dispatch techniques to determine which elevator car 204 (e.g., one of 204-1 or 204-2) will serve the elevator call and also determine the estimated elevator car arrival time based on existing and/or expected elevator demand. The controller 206 then sends the estimated elevator car arrival time and an optional elevator car assignment to the mobile device 208. Optionally the controller 206 may also send information regarding the status of the elevator car 204. Status may include operational status information, occupancy, position, and the estimated car arrival time, and the like.

Figure 4:
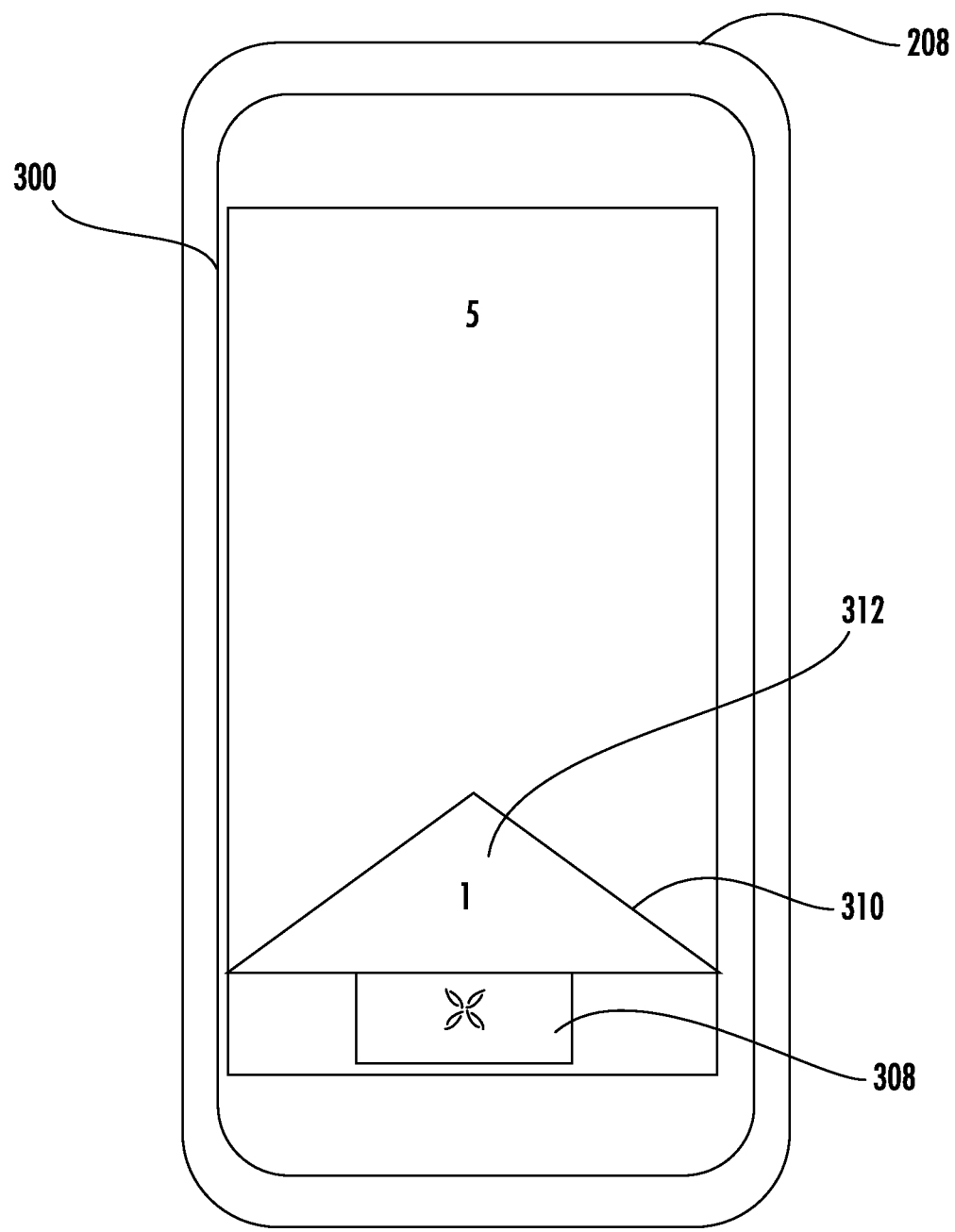
FIG. 4 depicts a user interface on a mobile device in an example embodiment.

The mobile device 208 then generates a user interface depicting the estimated elevator car arrival time and or motion. FIG. 4 depicts an example user interface 300 displaying the estimated elevator car arrival time. FIGS. 9-14 depict additional graphical representation indicating the estimated arrival time or motion of the elevator car 204. The user interface 300 includes at least one dynamic component that changes appearance in response to the estimated elevator car arrival time and or motion. The user interface 300 in FIG. 4 includes two dynamic components; a graphical dynamic component 310 and an alphanumeric dynamic component 312. The dynamic components 310 and 312 change appearance as the estimated elevator car arrival time changes. The user interface 300 also includes a graphic cancel icon 308, upon selection of which the elevator call is canceled.

Figure 5:
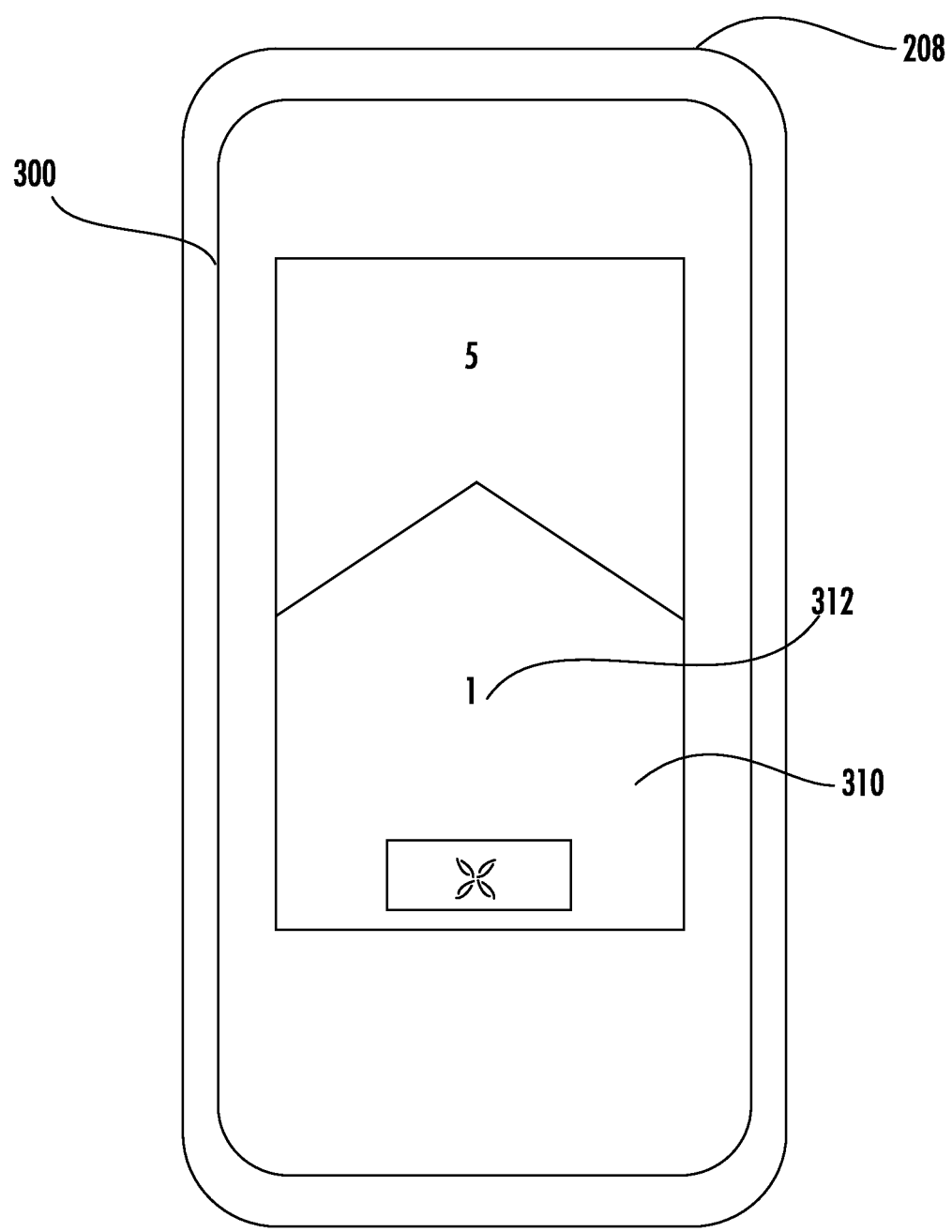
FIG. 5 depicts a user interface on a mobile device in an example embodiment.
Figure 6:
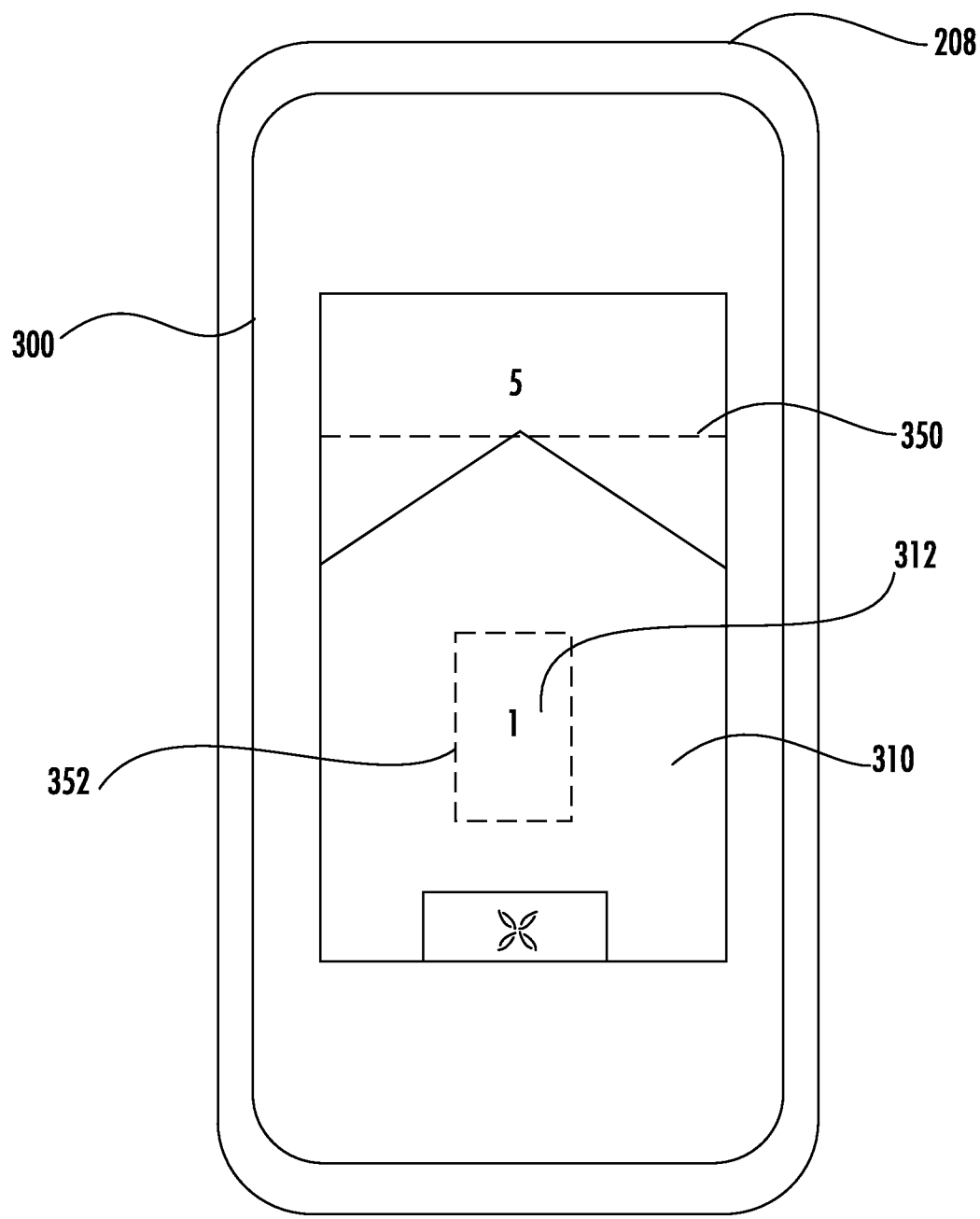
FIG. 6 depicts a user interface on a mobile device in an example embodiment.

FIGS. 5 and 6 depict the graphical dynamic component 310 and an alphanumeric dynamic component 312 increasing in size as the elevator car 204 travels to the first floor. The rate at which the graphical dynamic component 310 and the alphanumeric dynamic component 312 increase in size is dependent on the estimated elevator car arrival time. For example, if the estimated elevator car arrival time is 10 seconds, the graphical dynamic component 310 and the alphanumeric dynamic component 312 increase in size more rapidly than if the estimated elevator car arrival time was 30 seconds. More generally, the dynamic component(s) in the user interface 300 change appearance at a rate dependent on the estimated elevator car arrival time. As the elevator car 204 approaches the starting floor, the rate of change of the dynamic component(s) may slow.

In the state illustrated in FIG. 6, the graphical dynamic component 310 and the alphanumeric dynamic component 312 have completed transition from a starting state to a final state. This is depicted as graphical dynamic component 310 reaching final state indicator 350 and the alphanumeric dynamic component 312 reaching final state indicator 352. The final state indicators 350 and 352 allow a user to comprehend that the estimated elevator car arrival time is short.

Figure 7:
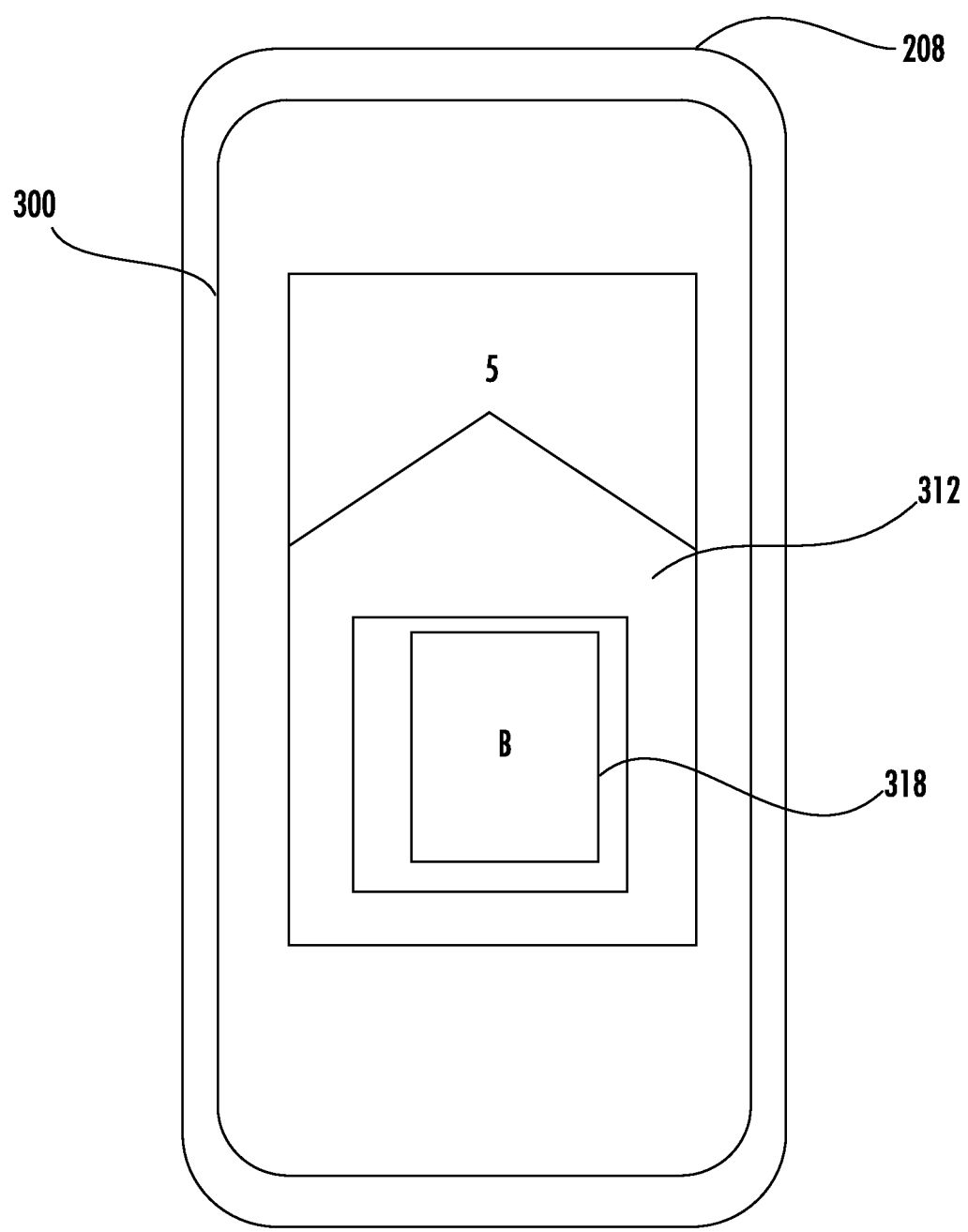
FIG. 7 depicts a user interface on a mobile device in an example embodiment.

Once the elevator car 204 arrives at the starting floor, the user interface may present an elevator car arrival indicator 318 as shown in FIG. 7. The elevator car arrival indicator 318 may be a symbol indicating that the elevator car 204 assigned to the user in response to the elevator call has arrived. The elevator car arrival indicator 318 may also include an elevator car assignment (e.g., the letter "B" indicating that the user should proceed to car B).

Figure 8:
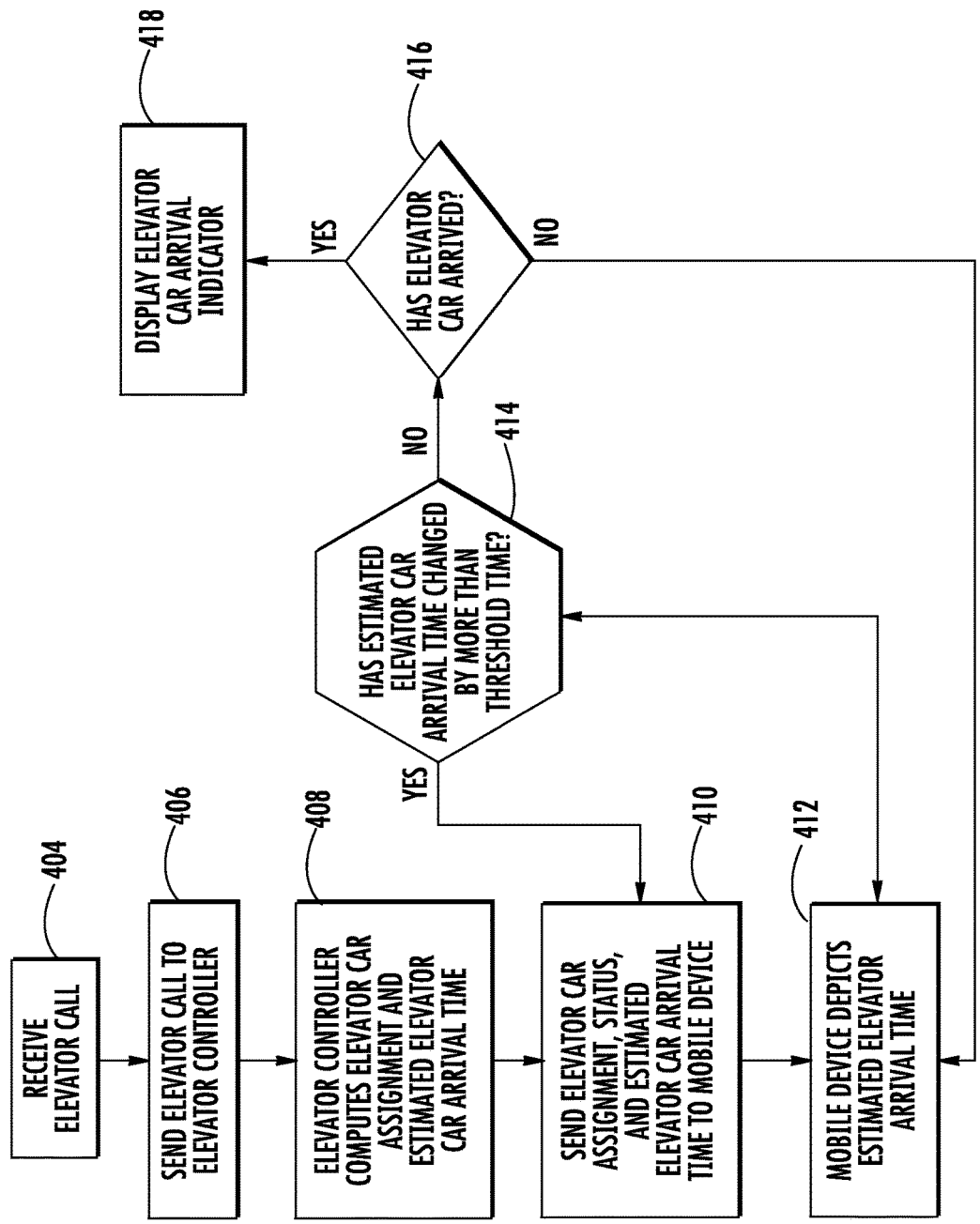
FIG. 8 is a flowchart of a process of depicting an elevator car arrival time in an example embodiment.

FIG. 8 is a flowchart of a process of depicting an estimated elevator car arrival time in an example embodiment. The process begins at 404, where an elevator call is entered on the mobile device 208. The elevator call may be a hall call or a destination call. At 406, the elevator call is provided to controller 206. At 408, the controller 206 determines an estimated elevator car assignment (if necessary) and an estimated elevator car arrival time. The estimated elevator car arrival time may be determined based on existing elevator demand, location of elevator car 204, predicted elevator demand, etc.

At 410, the controller 206 sends the estimated elevator car arrival time, elevator status information, and the elevator car assignment (if necessary) to the mobile device 208. At 412, the mobile device 208 generates the user interface 300 to display the estimated elevator car arrival time or motion using at least one dynamic component. For example, referring to FIG. 4, the mobile device 208 generates user interface 300 including the graphical dynamic component 310 and the alphanumeric dynamic component 312. The dynamic components 310 and 312 change appearance at a rate dependent on the estimated elevator car arrival time. The dynamic components 310 and 312 may also change appearance based on the motion or position of the elevator car 204.

If the estimated elevator car arrival time changes, the rate of change of the appearance of the dynamic components 310 and 312 may also change. For example, if the original estimated elevator car arrival time is increased, the rate of change of the appearance of the dynamic components 310 and 312 may slow to accommodate the increased estimated elevator car arrival time. The rate of change of the appearance of the dynamic components 310 and 312 may also stop completely to accommodate the increased estimated elevator car arrival time. The rate of change of the appearance of the dynamic components 310 and 312 may decrease in response to an increase in the estimated elevator car arrival time. As the status of the elevator car changes, eg, as the elevator car moves, in another embodiment the appearance of the dynamic components 310 and 312 may also change. For example, if the elevator car speed is increased, the rate of change of the appearance of the dynamic components 310 and 312 may increase. Likewise, the change of the appearance of the dynamic components 310 and 312 may also stop completely to accommodate instances where the elevator car has stopped, such as at an intervening floor.

At 414, the controller 206 determines if the estimated elevator car arrival time has changed by more than a threshold time. The estimated elevator car arrival time may change due to increased demand for the elevator car 204. In one example, the threshold time may be a predetermined time value, such as 15 seconds. In this scenario, if the estimated elevator car arrival time increases by more than 15 seconds, flow proceeds from 414 to 410. In another example, the threshold time may be determined from the initial estimated elevator car arrival time, such as a percentage. In this scenario, if the estimated elevator car arrival time increases by more than 30 percent, flow proceeds from 414 to 410.

If the estimated elevator car arrival time has changed by more than a threshold time at 414, flow proceeds to 410, where an updated estimated elevator car arrival time is sent from the controller 206 to the mobile device 208. The mobile device 208 will then update the user interface 300 to reflect the change in the estimated elevator car arrival time, as shown at 410 and 412. This may entail slowing the rate of change of the dynamic component(s) in response to a longer estimated elevator car arrival time. It should be noted that estimated elevator car arrival time, in one embodiment, indicates the time it will take the elevator car 204 to arrive at the starting floor as measured from the current time. In other words, the estimated elevator car arrival time is a measure of the estimated time from the current time (rather than the time the elevator call was made) to when the elevator car 204 is expected to arrive at the user starting floor. If the estimated elevator car arrival time has not changed by more than a threshold time at 414, flow proceeds to 416 where it is determined if the elevator car 204 has arrived at the starting floor. If the elevator car 204 has not arrived at the starting floor at 416, flow proceeds to 412 where the mobile device 208 continues to generate the user interface 300.

At 416, the mobile device 208 may determine that the elevator car 204 has arrived in a number of ways. The elevator controller 206 may send a signal to the mobile device 208 when the elevator car 204 arrives at the starting floor. This causes the mobile device 208 to update the user interface 300 to present the elevator car arrival indicator 318 as shown in FIG. 7. The user interface 300 may remain with the graphical dynamic component 310 at the final state indicator 350 and the alphanumeric dynamic component 312 at the final state indicator 352, as shown in FIG. 6, until the elevator controller 206 signals that the elevator car 204 has arrived.

The mobile device 208 may also conclude that the elevator car 204 has arrived after a timeout period has expired (e.g., if 3 minutes have passed since the elevator call was made). After the timeout period has expired, the mobile device 208 assumes that the elevator car 204 has arrived at the starting floor.

If the elevator car 204 has arrived at the starting floor at 416, flow proceeds to 418 where the mobile device 208 generates the elevator car arrival indicator 318 as shown in FIG. 7. The user may select the elevator car arrival indicator 318 to return the user interface 300 to the elevator call entry screen of FIG. 2.

The dynamic components 310 and 312 in FIGS. 4-7 are examples, and it is understood that other dynamic components may be used. In addition to changing size and position, a dynamic component may change color (e.g., from red to green) to indicate the estimated elevator car arrival time. The transition time of the color is dependent on the estimated elevator car arrival time.

Figure 9:
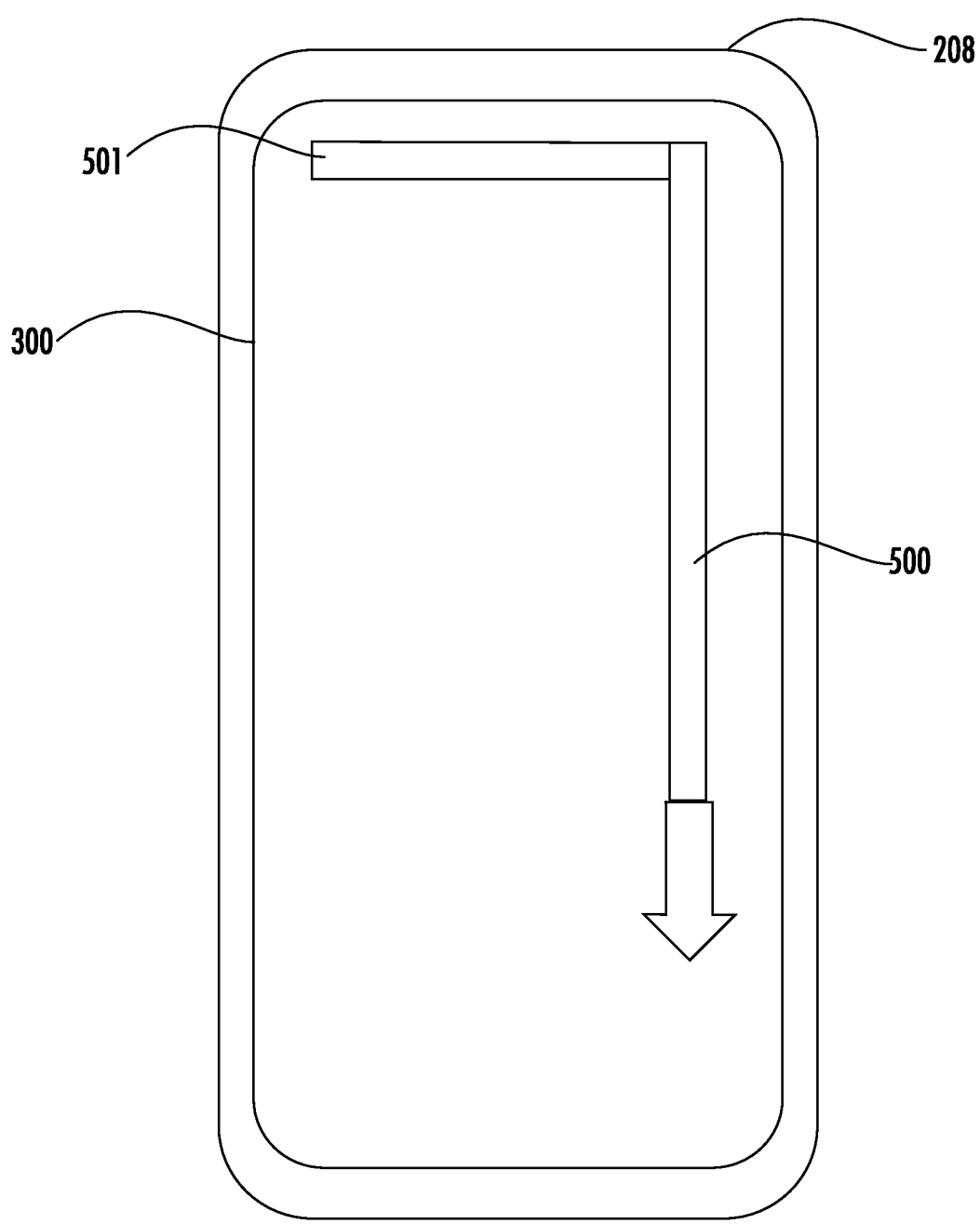
FIG. 9 depicts a user interface on a mobile device in example embodiments.

In another embodiment shown in FIG. 9, a dynamic component 500 comprises a border that encircles the outline of the user interface 300 at a rate dependent on the estimated elevator car arrival time. The dynamic component 500 starts at a starting point 501 and travels the outline of the user interface 300. When the dynamic component 500 reaches the starting point 501, the elevator car 204 should have arrived. The starting point 501 serves as the final state indicator.

Figure 10:
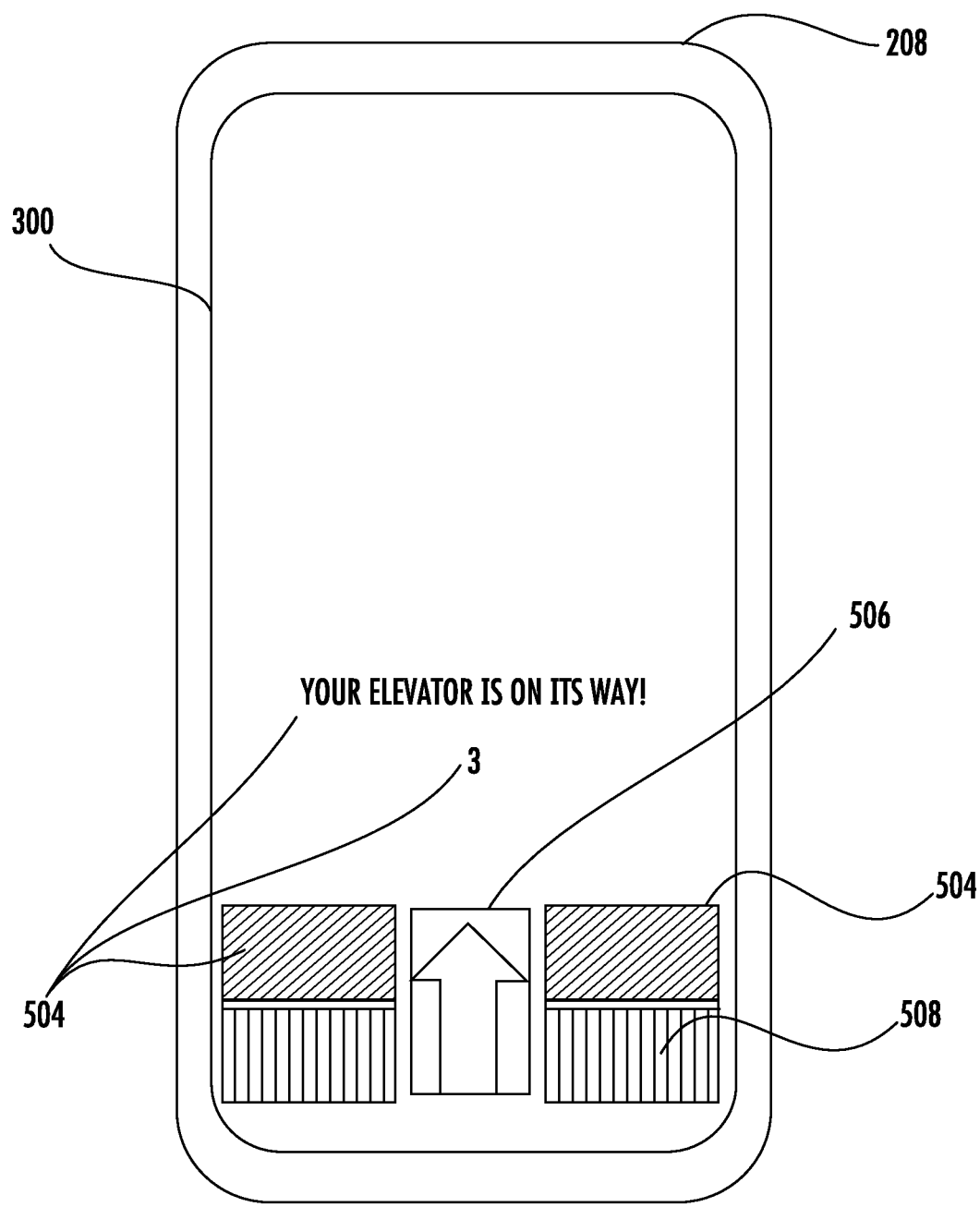
FIG. 10 depicts a user interface on a mobile device in example embodiments.

In another embodiment shown in FIG. 10, the dynamic component 504 comprises a graphical depiction of an elevator car 506 traveling past floor images 508 at a rate dependent on the estimated elevator car arrival time. The floors images 508 may be represented using different graphics (e.g., text colors, patterns, images) and scroll past the graphical depiction of an elevator car 506 to give the impression motion. As the elevator car 204 approaches the starting floor for the elevator call, the scrolling speed of the floor images 508 slows and eventually stops when elevator car 204 should have arrived. The dynamic component 504 could also be an alphanumerical display shown on the screen. For example, the numbers would count up or down relative to the actual location of the elevator car 204. They may also change based on the predicted location of the elevator car based on current known or expected demand, speed, trajectory. The numbers correlate to the specific building definition of the floors within the building (such that the physical 5th floor in a building may be labeled Floor 2 or M [mezzanine], and the alphanumeric position indicator will refer to the floor labels).

Figure 11:
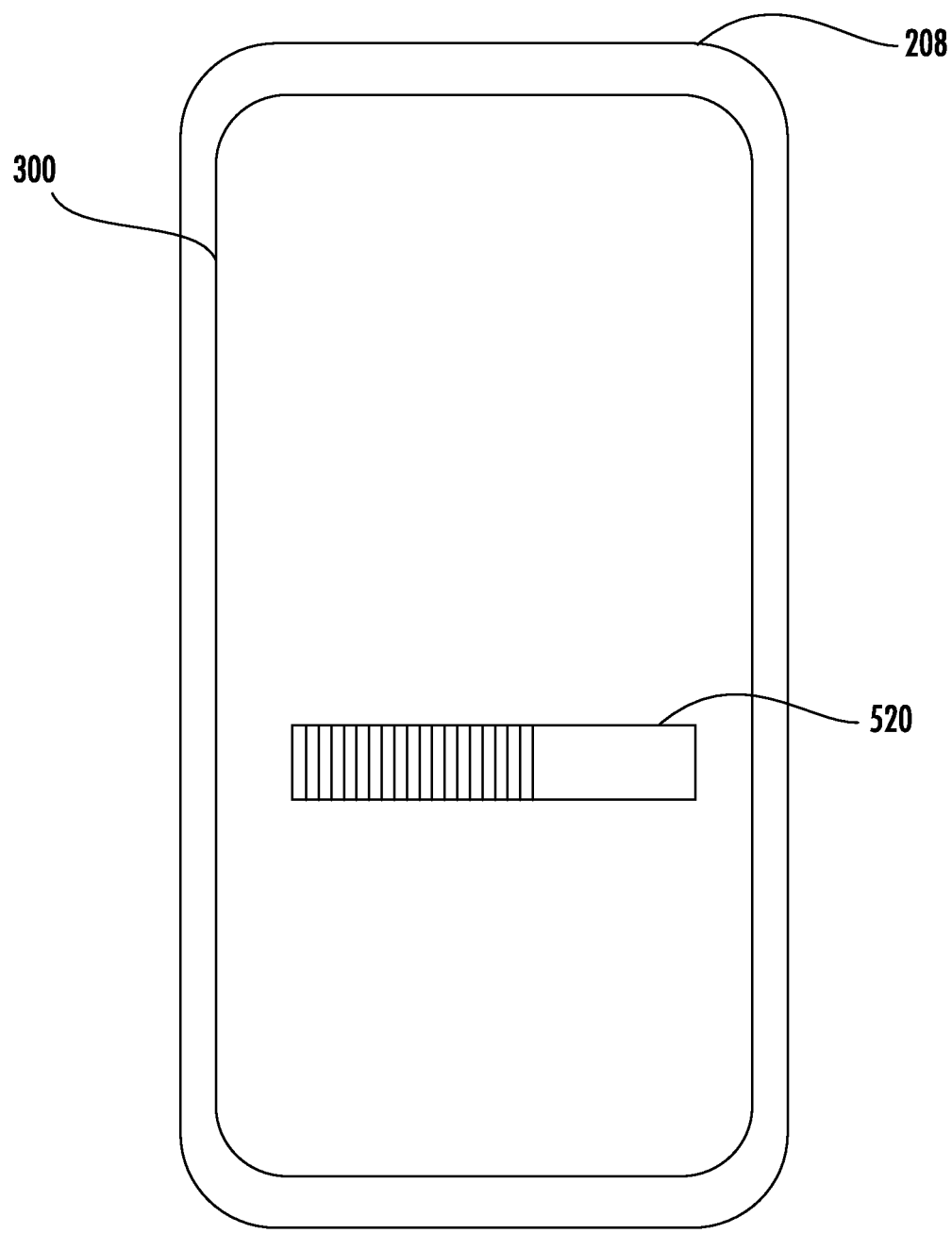
FIG. 11 depicts a user interface on a mobile device in example embodiments.

In another embodiment shown in FIG. 11, the dynamic component 520 comprises a loading bar that fills at a rate dependent on the estimated elevator car arrival time. The loading bar 520 starts empty and fills at a rate dependent on the estimated elevator car arrival time. The loading bar 520 is filled when elevator car 204 should have arrived.

Figure 12:
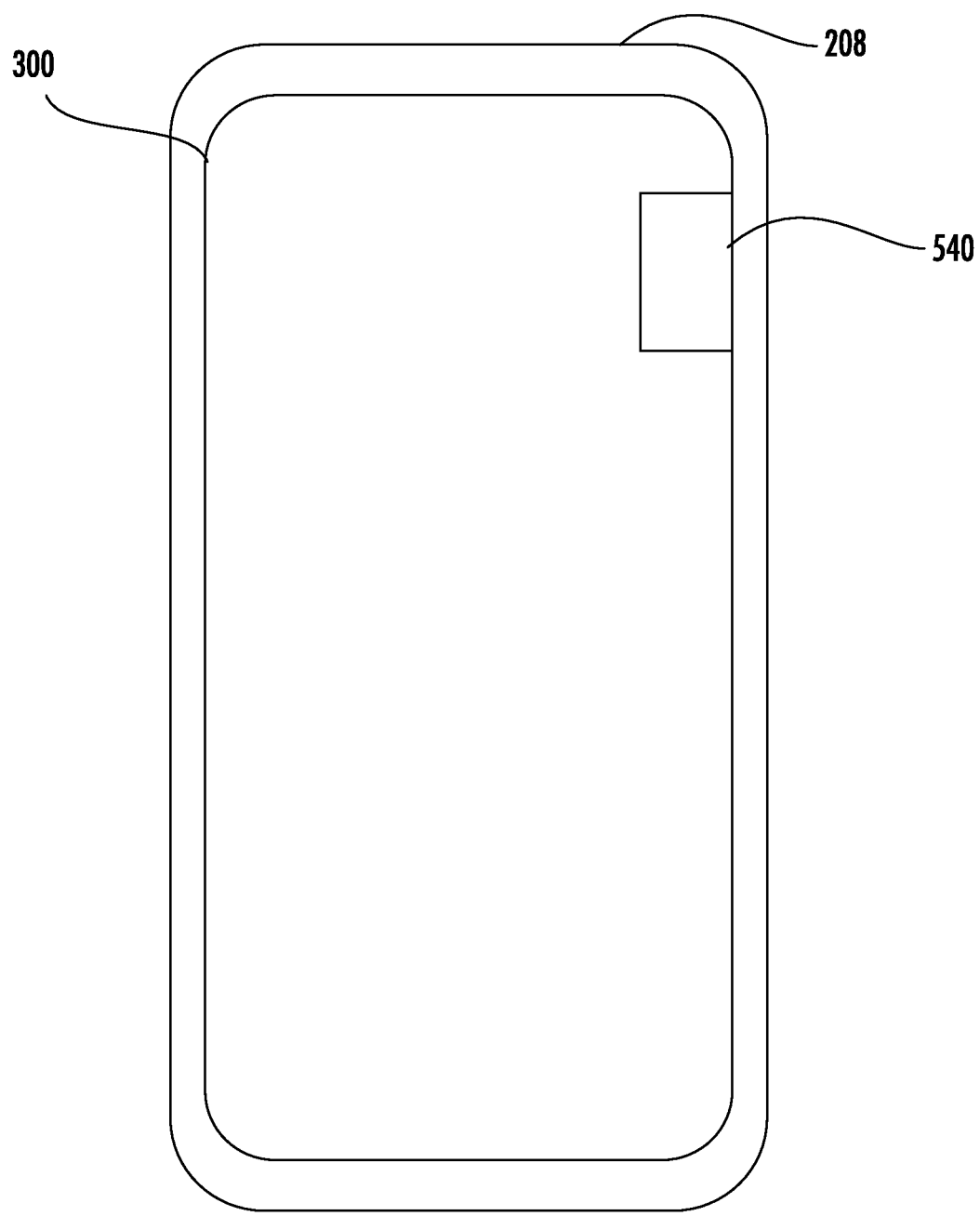
FIG. 12 depicts a user interface on a mobile device in example embodiments.
Figure 13:
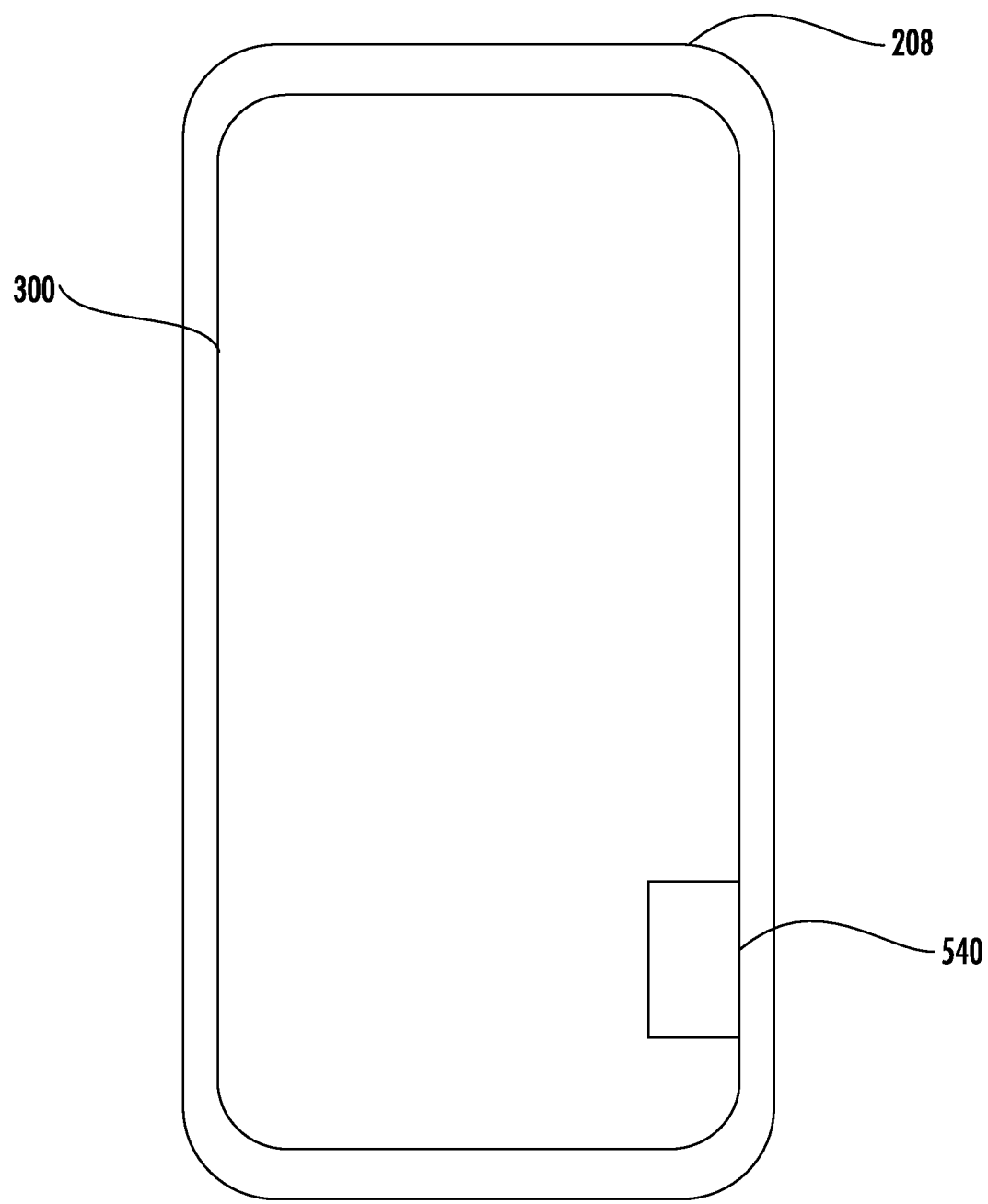
FIG. 13 depicts a user interface on a mobile device in example embodiments.

In another embodiment shown in FIGS. 12 and 13, the dynamic component 540 comprises a graphical representation of an elevator car 540 that travels along an edge of the user interface 300 at a rate dependent on the estimated elevator car arrival time. The graphical representation of an elevator car 540 may start at the top of the user interface 300 (FIG. 12) and travel downwards at a rate dependent on the estimated elevator car arrival time. As the elevator car 204 approaches the starting floor for the elevator call, the speed of the graphical representation of the elevator car 540 slows and eventually stops at a second position when elevator car 204 should have arrived.

The arrival of elevator car 204 is indicated by the graphical representation of the elevator car 540 reaching the bottom of the user interface 300 (FIG. 13). Movement of the graphical representation of the elevator car 540 may correspond to motion of the physical elevator car 204. For example, the graphical representation of the elevator car 540 can stop when the elevator car 204 stops. The scale of the graphical representation of the elevator car 540 can also be adjusted so that the height of the user interface 300 is proportional to the height of the building or hoistway in which the elevator car 204 travels. The position of the graphical representation of the elevator car 540 may be proportional to the current floor of the elevator car 204 in the building. The graphical representation of the elevator car 540 may also indicate the status of the elevator car doors (e.g., open or closed).

In another embodiment shown in FIG. 10, the dynamic component 504 comprises a graphical depiction of an elevator car 506 traveling past floor images 508 at a rate dependent on the estimated elevator car arrival time. The floors images 508 may be represented using different graphics (e.g., colors, patterns, images) and scroll past the graphical depiction of an elevator car 506 to give the impression motion. As the elevator car 204 approaches the starting floor for the elevator call, the scrolling speed of the floor images 508 slows and eventually stops when elevator car 204 should have arrived.

In another embodiment shown in FIG. 11, the dynamic component 520 comprises a loading bar that fills at a rate dependent on the estimated elevator car arrival time. The loading bar 520 starts empty and fills at a rate dependent on the estimated elevator car arrival time. The loading bar 520 is filled when elevator car 204 should have arrived. In another embodiment, the progress bar could fill based on the result of an algorithm which estimates car arrival time based on current demand; either at the time it was requested, or real-time at-the-moment demand (such as the door is held open at a hall stop, causing a delay, etc.).

In another embodiment shown in FIGS. 12 and 13, the dynamic component 540 comprises a graphical representation of an elevator car 540 that travels along an edge of the user interface 300 at a rate dependent on the estimated elevator car arrival time. The graphical representation of an elevator car 540 may start at the top of the user interface 300 (FIG. 12) and travel downwards at a rate dependent on the estimated elevator car arrival time. As the elevator car 204 approaches the starting floor for the elevator call, the speed of the graphical representation of the elevator car 540 slows and eventually stops at a second position when elevator car 204 should have arrived.

The arrival of elevator car 204 is indicated by the graphical representation of the elevator car 540 reaching the bottom of the user interface 300 (FIG. 13). Movement of the graphical representation of the elevator car 540 may correspond to motion of the physical elevator car 204. For example, the graphical representation of the elevator car 540 can stop when the elevator car 204 stops. The scale of the graphical representation of the elevator car 540 can also be adjusted so that the height of the user interface 300 is proportional to the height of the building or hoistway in which the elevator car 204 travels. The position of the graphical representation of the elevator car 540 may be proportional to the current floor of the elevator car 204 in the building. The graphical representation of the elevator car 540 may also indicate the status of the elevator car doors (e.g., open or closed). The graphical representation could depict a set of open doors, change colors, or include text to indicate its status. For example depicting a graphic of the closed elevator doors or a darker color while the graphic simulating motion of the elevator is moving and open doors or a brighter color indicating the doors have opened when the elevator car is at a landing.

In another embodiment shown in FIGS. 14A-14C, the user interface 300 includes a graphical stylistic animation 560 that includes, but is not limited to, a the dynamic component 504, graphical representation of the elevator car 506, 540 floor images 508, or images depicting the building, or any other image that the user may preselect to indicate movement in the building. In an embodiment the stylistic animation 560 moves at a rate dependent on the estimated elevator car 204 arrival time as in the embodiments above. In another embodiment, the stylistic animation 560 may move with the position of the elevator car 204 in the building as described with respect to the previous embodiments The stylistic animation 560 may be represented using different graphics (e.g., text, colors, dynamic patterns, patterns, images static screens, or dynamically drawn elements which may be animated into a slide show) and include portions that scroll past the graphical depiction of an elevator car 506 to provide the impression motion of the elevator car 204. In some embodiments the stylistic animations 560 may include various floor images 508 foster the appearance of the elevator moving. As the elevator car 204 approaches the starting floor for the elevator call made by the user, the scrolling speed of the stylistic animation 560 slows and eventually stops when elevator car 204 should have arrived. In some embodiments the direction the stylistic animations 560 or graphics within the stylistic animation 560 may move in the same direction as the motion of the elevator car 204 to provide additional information to the user.

In another embodiment the stylistic animations 560 could include alphanumerical information shown on the screen. For example, the numbers would count up or down relative to the actual location of the elevator car 204. They may also change based on the predicted location of the elevator car based on current known or expected demand, speed, trajectory. The numbers correlate to the specific building definition of the floors within the building (such that the physical 5th floor in a building may be labeled Floor 2 or M [mezzanine], and the alphanumeric position indicator will refer to the floor labels).

Turning to FIG. 14C as well, the arrival of elevator car 204 is indicated by the graphical representation of the elevator car 506 reaching the bottom of the user interface 300 or filling the space in the stylistic animation 560 as depicted in the figure. In an embodiment, movement of the stylistic animation 560 may correspond to motion and or speed of the physical elevator car 204. For example, the stylistic animation 560 can stop when the elevator car 204 stops and the duration can be associated with the duration required for the elevator car 204 to arrive at the floor of the user. The scale of the stylistic animation 560 can also be adjusted so that the height of the user interface 300 is proportional to the height of the building or hoistway in which the elevator car 204 travels. Though depicted near the bottom of the user interface 300 the stylistic animation 560 can be at any position on the user interface. In addition, the position of the graphical representation of the elevator car 540 may be proportional to the current floor of the elevator car 204 in the building. The graphical representation of the elevator car 506 may also indicate the status of the elevator car doors (e.g., open or closed).

Continuing with FIGS. 9-14A, 14B, 14C in another embodiment the stylistic animation 560 that is interactive with the user. For example the stylistic animation 560 including but not limited to the dynamic component 504, the graphical depiction of the elevator car 506, or moving floor images 508 may include updates and information, system or building notifications, news, advertisements, and the like targeted to the user if requested. The stylistic animation 560 may be represented using different graphics (e.g., colors, patterns, images) that move and/or scroll past the graphical depiction of an elevator car 506 to give the impression motion. In another embodiment the stylistic animation 560 may be interactive, for example responding to a user's query, providing preselected information or news as the user is waiting for the assigned elevator car 204. In an embodiment, the stylistic animation 560 could include an augmented reality type display. For example, in one embodiment, the user interface 300 and could include engaging the mobile device's camera and gyroscope to allow the user to pan their device around the environment, and display the stylistic animation 560 of a simulated building cut-away illustration to show where their assigned elevator car 204 is above or below them (for example, similar to an x-ray vision type display, but their assigned car is the focus, for example). In an embodiment the stylistic animation 560 may be a game, or informative display linked to the user's behavior waiting for the correct elevator. In yet another embodiment, the stylistic animation 560 may be interactive with the user such that a user is "rewarded" for waiting at the correct elevator. For example the user interface 300 could display a slogan or statement e.g. "Good Job" "Thank You", and the like, in other embodiments the user interface could provide some audible or tactile feedback to provide indication of waiting at the correct elevator, boarding the correct elevator and the like. In some embodiments rewards may be provided or associated with a user's status, e.g., handicapped, VIP, and the like. Further yet, a reward could be of the form of a small, game, puzzle, brain teaser, quiz, trivia, and the like. In another embodiment, one example of the interactive nature of the stylistic animation 560 may take the form of a game, puzzle, brain teaser, quiz, trivia, and the like where various levels of success in the game puzzle etc. may also include providing the user with additional benefits or features in the elevator system such as temporary VIP status, express service and additional benefits or features in the building. In another embodiment, the benefits could even go beyond the elevator system, but instead be related to other commercial enterprises perhaps in the building or business partners. Featured service in a hotel, free meals, discounts and the like.

In another embodiment, the user movements and activities may be tracked using conventional techniques to provide relevant notifications and timely information on the user interface 300. Movement and content of the graphical representation of the elevator car 506 and/or stylistic animation 560 may correspond to the movement and activities of the user either waiting to board the elevator car 204 as well as once having boarded the elevator car 204. For example, the elevator system could track the presence of a person with diminished or impaired abilities and cause the response of the elevator to change when a VIP or person with special needs is scheduled to board the elevator.

In another embodiment the stylistic animation 560 is customized to the building, floor, elevator activities for each floor, or even activities associated with a particular elevator car. For example, in one embodiment the stylistic animation 560 may change depending on the particular building, providing screens, graphics, logos, even scenes and graphics that are customized to that particular building. Furthermore, the stylistic animation 560 when linked with tracking the user and interactivity could provide personalized graphics and information to the user on the user interface 300. In another embodiment, the stylistic animation 560 may change as the user moves through the building, providing screens, graphics, logos, even scenes and graphics that are customized not only to the particular building but to the floor and location in the building. Furthermore, the stylistic animation 560 when linked with tracking the user and interactivity could provide personalized graphics and information to the user on the user interface 300 that is modified as the user moves through the building. Movement of the graphical representation of the elevator car 540 and stylistic animation 560 may correspond to motion of the physical elevator car 204. For example, the graphical representation of the elevator car 540 can stop when the elevator car 204 stops. The scale of the graphical representation of the elevator car 540 and stylistic animation 560 can also be adjusted so that the height of the user interface 300 is proportional to the height of the building or hoistway in which the elevator car 204 travels. The position of the graphical representation of the elevator car 540 may be proportional to the current floor of the elevator car 204 in the building. The graphical representation of the elevator car 540 may also indicate the status of the elevator car doors (e.g., open or closed).

The stylistic animation 560 of the embodiments described herein provides several advantages to the user. Providing a simple representation of car progress reduces data requirements of needing know the exact location by floor of the car at a given point in time. The stylistic animation 560 provides the user an entertaining activity to focus on while waiting for the elevator, which reduces anxiety and any perception of delay when user is waiting to board the elevator car 204. In embodiments where the stylistic animation 560, images, and graphics are presented are associated with a particular building, and the application would then facilitate customize graphics that may include building or product branding to be utilized and/or targeted to the user.

It is understood that the user interfaces in FIGS. 9-14 are just examples, and embodiments may include a variety of user interfaces having one or more dynamic components that change at a rate dependent on the estimated elevator car arrival time.

Embodiments provide a number of benefits in communicating an estimated elevator car arrival time to a user. It is noted that no language is required to describe elevator car motion and the estimated elevator car arrival time. The estimated elevator car arrival time is presented in a relative or fuzzy manner and can be adjusted if the estimated elevator car arrival time is delayed. The mobile device uses an initial estimated elevator car arrival time to create the user interface and does not require constant communication between the controller and the mobile device. If a significant delay occurs, the controller then sends an updated estimated elevator car arrival time to the mobile device.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer program products or computer-readable media, such as a transitory and/or non-transitory computer-readable medium. The instructions, when executed, may cause an entity (e.g., a processor, apparatus or system) to perform one or more methodological acts as described herein.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the scope of the disclosure. Additionally, while various embodiments have been described, it is to be understood that aspects of the disclosure may include only some of the described embodiments. Accordingly, the disclosure is not to be seen as limited by the foregoing description, but is only limited by the scope of the appended claims.

What is claimed is:

1. A method for presenting information on the status of an elevator car, the method comprising:
    generating an elevator call at a mobile device;
    obtaining information regarding the status of the elevator car indicative of the motion of the elevator car in response to the elevator call; and
    generating a user interface on the mobile device depicting a stylistic animation, that changes appearance in response to the motion of the elevator car;
    wherein, the stylistic animation changes in response to the estimated elevator car arrival time at least one of text, size, color, and position.

2. The method of claim 1 wherein the elevator call comprises at least one of a hall call and a destination call.

3. The method of claim 1 further comprising, generating on the user interface an elevator car arrival indicator upon determining the elevator car has arrived at a starting floor.

4. The method of claim 3 further comprising, determining an elevator car assignment in response to the elevator call.

5. The method of claim 4 wherein the elevator car arrival indicator includes the elevator car assignment.

6. The method of claim 1 further comprising, generating on the user interface a dynamic component, that changes appearance in response to an estimated elevator car arrival time.

7. The method of claim 1 wherein the stylistic animation comprises a dynamic component wherein the dynamic component comprises at least one of an alphanumeric dynamic component and a graphical dynamic component.

8. The method of claim 7 wherein the stylistic animation comprises at least one of a dynamic component, a graphical depiction of an elevator car, and a graphical depiction of floor images.

9. The method of claim 7 wherein the stylistic animation includes a graphical animation responsive to the motion of the elevator car.

10. A method for presenting information on the status of an elevator car, the method comprising:
    generating an elevator call at a mobile device;
    obtaining information regarding the status of the elevator car indicative of the motion of the elevator car in response to the elevator call; and
    generating a user interface on the mobile device depicting a stylistic animation, that changes appearance in response to the motion of the elevator car;
    wherein the stylistic animation comprises a dynamic component wherein the dynamic component comprises at least one of an alphanumeric dynamic component and a graphical dynamic component;
    wherein the stylistic animation includes a graphical animation responsive to the motion of the elevator car;
    wherein the graphical animation includes a set of scrolling images including a depiction of the elevator car, where the scrolling images move past the depiction of the elevator car to provide a visual appearance of motion.

11. The method of claim 10 wherein the scrolling images change based on the motion of the elevator car.

12. The method of claim 9 wherein the graphical animation changes speed in response to at least one of the speed of the elevator car and an estimated arrival time of the elevator car.

13. The method of claim 9 wherein the graphical animation is interactive with the user.

14. The method of claim 13 wherein the graphical animation changes for a selected user and provides the user with information targeted the user and wherein the user specific information includes at least one of elevator status, elevator door status, news, and a reward.

15. The method of claim 13 wherein the graphical animation is at least one of a game, puzzle, and brain teaser.

16. The method of claim 15 wherein success at the least one of a game, puzzle, and brain teaser at least one of provides a slogan or reward to the user, changes the elevator operation with respect to the user, and provides additional benefits to the user.

17. The method of claim 1 further including tracking a location of the mobile device.

18. A method for presenting information on the status of an elevator car, the method comprising:
    generating an elevator call at a mobile device;
    obtaining information regarding the status of the elevator car indicative of the motion of the elevator car in response to the elevator call;
    generating a user interface on the mobile device depicting a stylistic animation, that changes appearance in response to the motion of the elevator car;
    tracking a location of the mobile device;
    wherein the stylistic animation is customized to at least one of the user and is responsive to the location of the user.

19. A mobile device comprising:
    a processor;

a memory comprising computer-executable instructions that, when executed by the processor, cause the processor to perform operations, the operations comprising:

generating an elevator call at a mobile device;

obtaining information regarding the status of the elevator car indicative of the motion of the elevator car in response to the elevator call; and generating a user interface on the mobile device depicting a stylistic animation, that changes appearance in response to the motion of the elevator car;

wherein, the stylistic animation changes in response to the estimated elevator car arrival time at least one of text, size, color, and position.

* * * * *